Feb. 16, 1932.  F. P. NOFFSINGER ET AL  1,845,324
LAND LEVELER
Filed May 31, 1930   2 Sheets-Sheet 1
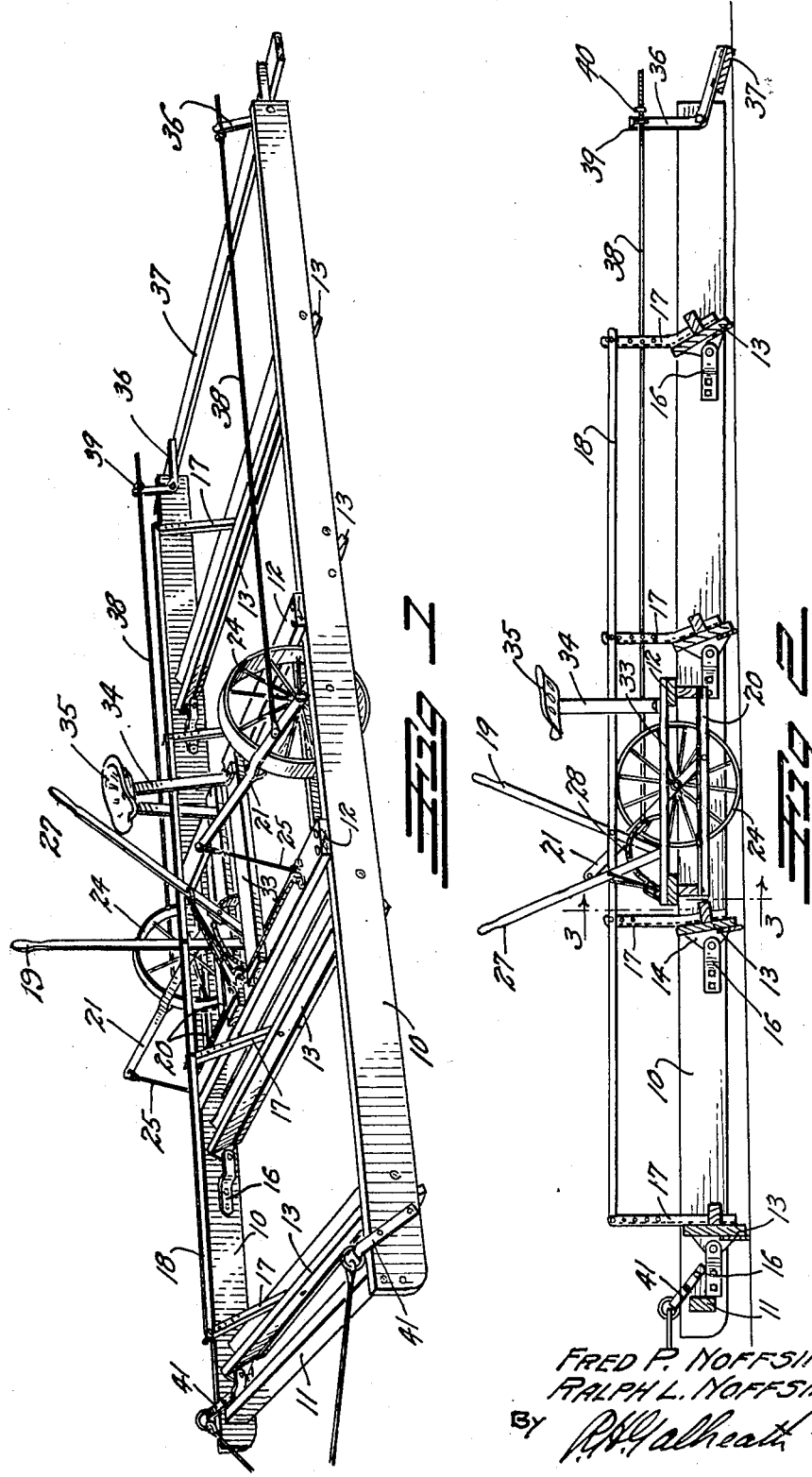
Inventors
FRED P. NOFFSINGER
RALPH L. NOFFSINGER
By
Attorney

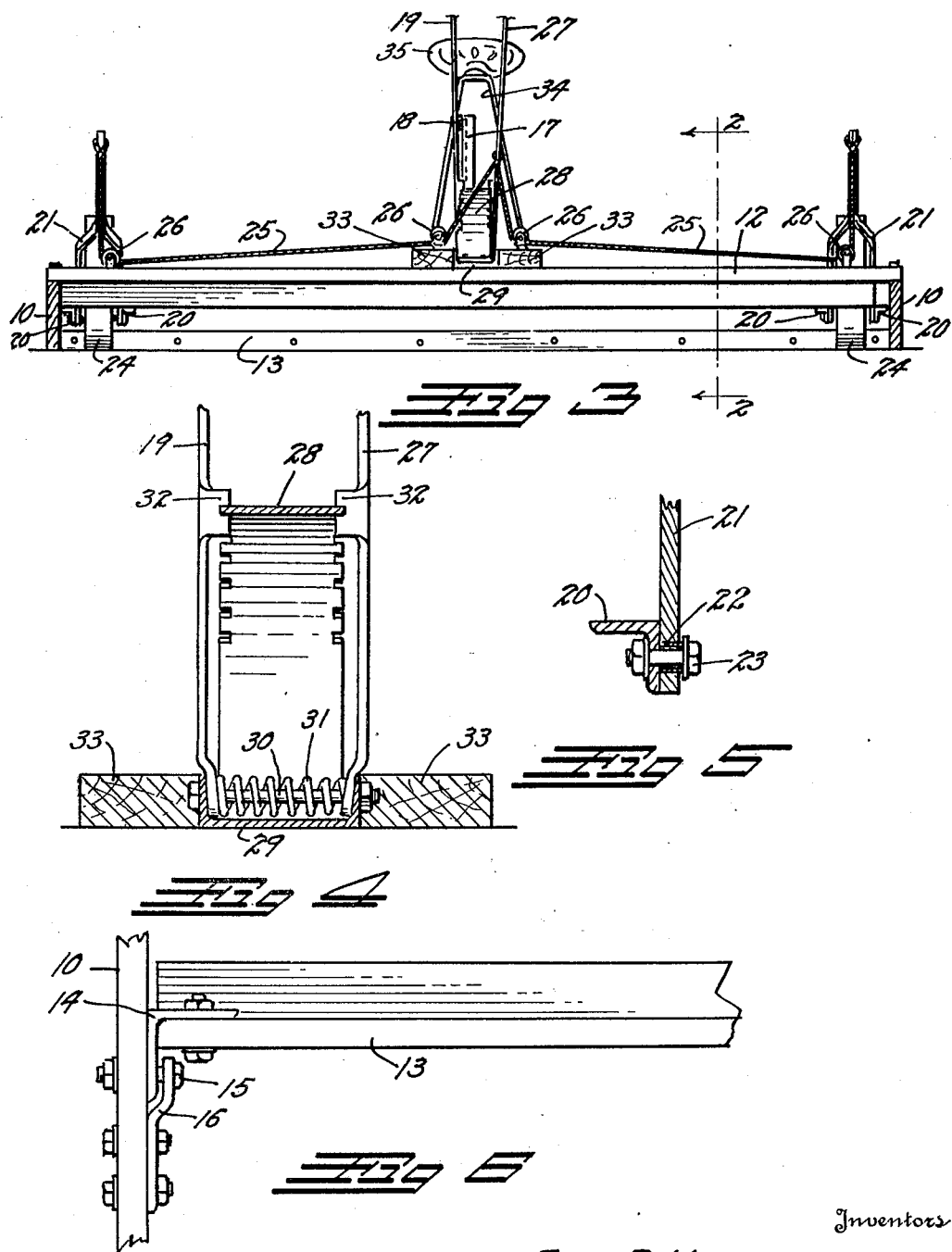

Patented Feb. 16, 1932

1,845,324

UNITED STATES PATENT OFFICE

FRED P. NOFFSINGER AND RALPH L. NOFFSINGER, OF GREELEY, COLORADO

LAND LEVELER

Application filed May 31, 1930. Serial No. 458,473.

This invention relates to a land leveling device and has for its principal object the provision of a simple and efficient device of this character which will rapidly and accurately cut down the high spots and fill the low spots of the land so as to leave a smooth uniform level surface.

Another object of the invention is to provide means which will prevent the runners or the scrapers from leaving ridges at their extremities so that the land surface will not show tracks of the passage of the leveler.

A further object of the invention is to provide a series of manual adjustments which will allow the operator to control all of the scrapers so as to cut or fill as desired and to allow the operator to raise the entire machine for turning or transportation.

A still further object is to provide a series of scrapers successively positioned at more gradual angles so as to gradually bring the ground to a finished level condition.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 1 is a perspective view of the complete land leveler.

Fig. 2 is a longitudinal section therethrough, taken on the line 2—2, Fig. 3.

Fig. 3 is a cross section through the leveler, taken on the line 3—3, Fig. 2.

Fig. 4 is a detail view illustrating the method of attaching the operating levers.

Fig. 5 is a detail view of the hinge joint between the wheel yokes and frame.

Fig. 6 is a detail view of the joint between the scrapers and the runners of the leveler.

The invention comprises two longitudinal runners 10 separated and braced at their forward extremity by means of a cross bream 11 and intermediate their extremities by two cross members 12. A series of hinged scrapers 13 extend between the runners 10. Angle clips 14 are bolted to the extremities of the scrapers 13, and extend forwardly about pivot bolts 15 in the runners. The bolts 15 are braced by means of bracket plates 16 secured to the runners.

By this construction the scrapers may be freely rotated to any desired angle. This rotation is accomplished by means of standards 17 which extend upwardly from each of the scrapers. All of the standards 17 are connected together by means of a connecting bar 18 so that they will move in unison. The standards 17 are each provided with a series of openings for the attachment of the connecting bar 18 so that their arc of movement can be adjusted. The connecting bar 18 is attached to a scraper operating lever 19.

It will be noted that each of the standards 17 is bent to a differing angle so that as the rear of the machine is approached each scraper will have a greater inclination from the vertical.

The cross members 12 preferably consist of two wooden beams. The upper one lies flat across the tops of the runners 10. The under one is positioned edgewise, as shown in Fig. 2, to stiffen the upper one. At each side of the machine an angle iron frame 20 extends between the lower beams of the two members 12. A wheel yoke 21 is hinged at its lower extremities to the angle iron frame 20. The details of this hinge are illustrated in Fig. 5, in which a sleeve 22 is placed about a pivot bolt 23, extending from the angle iron frame 20. The sleeve 22 prevents the bolt from clamping the yoke 21 and allows it to rotate freely thereabout.

A ground wheel 24 is journaled in each of the wheel yokes 21 so that it will of its own weight rest upon the ground. The upper extremities of the wheel yokes 21 are secured to operating cables 25 which pass under guide pulleys 26 and upwardly to a wheel operating lever 27.

The levers 19 and 27 are maintained in any desired position by means of a toothed segment band 28. The segment band 28 is supported on an upwardly turned channel bar which extends longitudinally of the lever between the struts 12. The two levers are held on the inside of the channel bar 29 upon a hinge bolt 30 and a compression spring 31 surrounds the hinge bolt 30 and acts to constantly force the levers against the inside faces of the channel 29. Each of the levers is provided with a tooth 32 to engage the teeth in the segment band 28.

It will be noted that when it is desired to move the levers they can be pulled outwardly so that the teeth 32 will disengage the band 28. When the desired position has been reached, the spring 31 in tending to force the lower extremities of the levers outwardly, will cause the teeth 32 to again engage the segment band.

At each side of the channel bar 29 a foot board 33 is placed for the feet of the operator and to support a seat standard 34 carrying the operator's seat, 35.

At the rear extremity of each of the runners 10 a bell crank lever 36 is pivoted to support a trail board 37. The trail board normally lies upon the ground at the rear of the runners and its extremities extend outward beyond the runners at each side of the leveler. The trail board carries none of the weight of the device. It simply floats over the ground at the rear.

An operating rod 38 extends from the upper extremity of each lever 36 to a connection upon the wheel yoke 21 at that side of the machine. Each operating rod 38 slidably passes through a loop 39 on each of the levers 36 and is provided with a threaded stop nut 40.

Attachment links 41 at the forepart of the runners 10 provide means for the attachment of a tractor or a team for drawing the leveler.

*Operation*

As the leveler is drawn over the ground the operator pulls the operating lever 19 rearwardly to cause the scrapers to bite or cut the desired amount. The first scraper does the majority of the cutting. The following scrapers, owing to their increased angle, serve to deposit and press the filling dirt into place and finally the trail board 37 gives a finishing touch which crushes and smooths the clods and erases the tracks or piles caused by the extremities of the scrapers 13 and the runners 10.

When it is desired to turn the machine at the extremity of the field, the operator pushes the scraper lever 19 forward causing all of the scrapers to rise out of contact with the ground. He then pulls the wheel lever 27 rearwardly, which acts through the cables 25 to pull the wheel yokes 21 downwardly. This forces the ground wheels 24 into contact with the ground and elevates the entire machine.

It will be noted that as the wheel yokes 21 move downward the operating rods 38 are pulled forward until the nuts 40 thereon engage the links 39 of the bell crank levers 36. This elevates the trail board out of contact with the ground so that the entire machine can be swung about on the wheels 24 or can be transported to a new location.

The lever 27 is also used to distribute the weight between the wheels and the scrapers so that the operator can carry the amount of earth desired and also can vary the load to suit the tractive power available.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A ground leveling device comprising: a pair of longitudinal runners; scrapers extending between said runners; wheel yokes hinged to said device at their one extremity; a flexible medium connected to the other extremity of said wheel yokes; ground wheels carried in said yokes; a lever connected to said flexible medium so as to draw said other extremity downward to cause said ground wheels to engage the ground and elevate said runners; a trail board hinged to said device; and an operative connection between said trail board and each of said wheel yokes so that as the latter are depressed the former will be elevated.

2. In a ground leveling device having ground wheels; and means for depressing said ground wheels into engagement with the ground so as to elevate said device, the combination of a scraper member hinged to said device and an operative connection between said wheel depressing means and said scraper member so that as said wheels are depressed said scraper member will be elevated.

In testimony whereof, we affix our signatures.

FRED P. NOFFSINGER.
RALPH L. NOFFSINGER.